(No Model.) 5 Sheets—Sheet 1.

I. L. JOHNSON.
CONDUIT FOR ELECTRIC CONDUCTORS AND POWER CABLES.

No. 375,876. Patented Jan. 3, 1888.

Witnesses
F. L. Ourand
W. P. Bell

Isaac LaRue Johnson
Inventor (No Model.)   5 Sheets—Sheet 2.
I. L. JOHNSON.
CONDUIT FOR ELECTRIC CONDUCTORS AND POWER CABLES.
No. 375,876.   Patented Jan. 3, 1888.
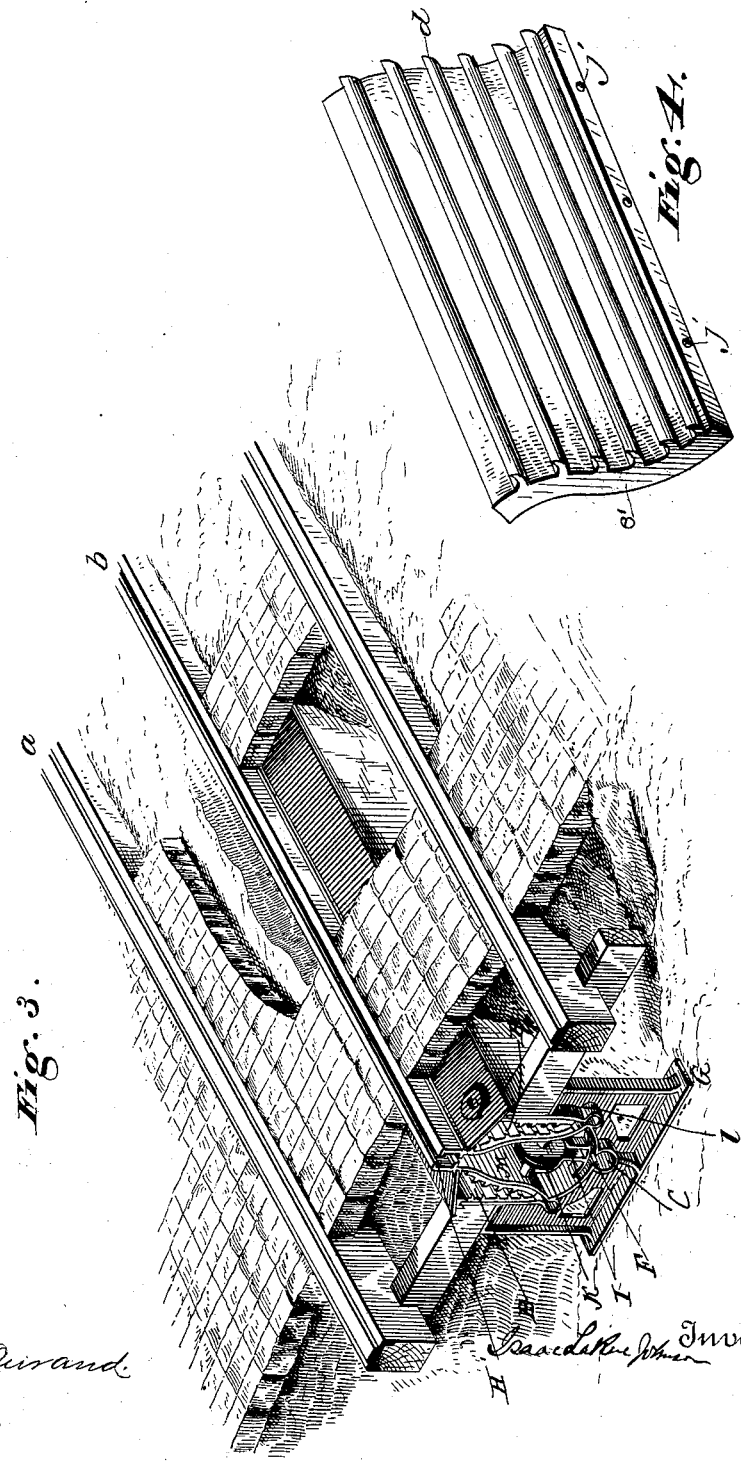
Witnesses
Franck L. Ourand.
R. G. Bell.
Isaac L. Johnson Inventor (No Model.) 5 Sheets—Sheet 3.

I. L. JOHNSON.
CONDUIT FOR ELECTRIC CONDUCTORS AND POWER CABLES.

No. 375,876. Patented Jan. 3, 1888.

Witnesses
F. L. Durand
W. P. Bell

Isaac Lakin Johnson
Inventor (No Model.) 5 Sheets—Sheet 4.
I. L. JOHNSON.
CONDUIT FOR ELECTRIC CONDUCTORS AND POWER CABLES.
No. 375,876. Patented Jan. 3, 1888.

Witnesses
F. L. Ourand.
W. P. Bell

Isaac Lothur Johnson
Inventor

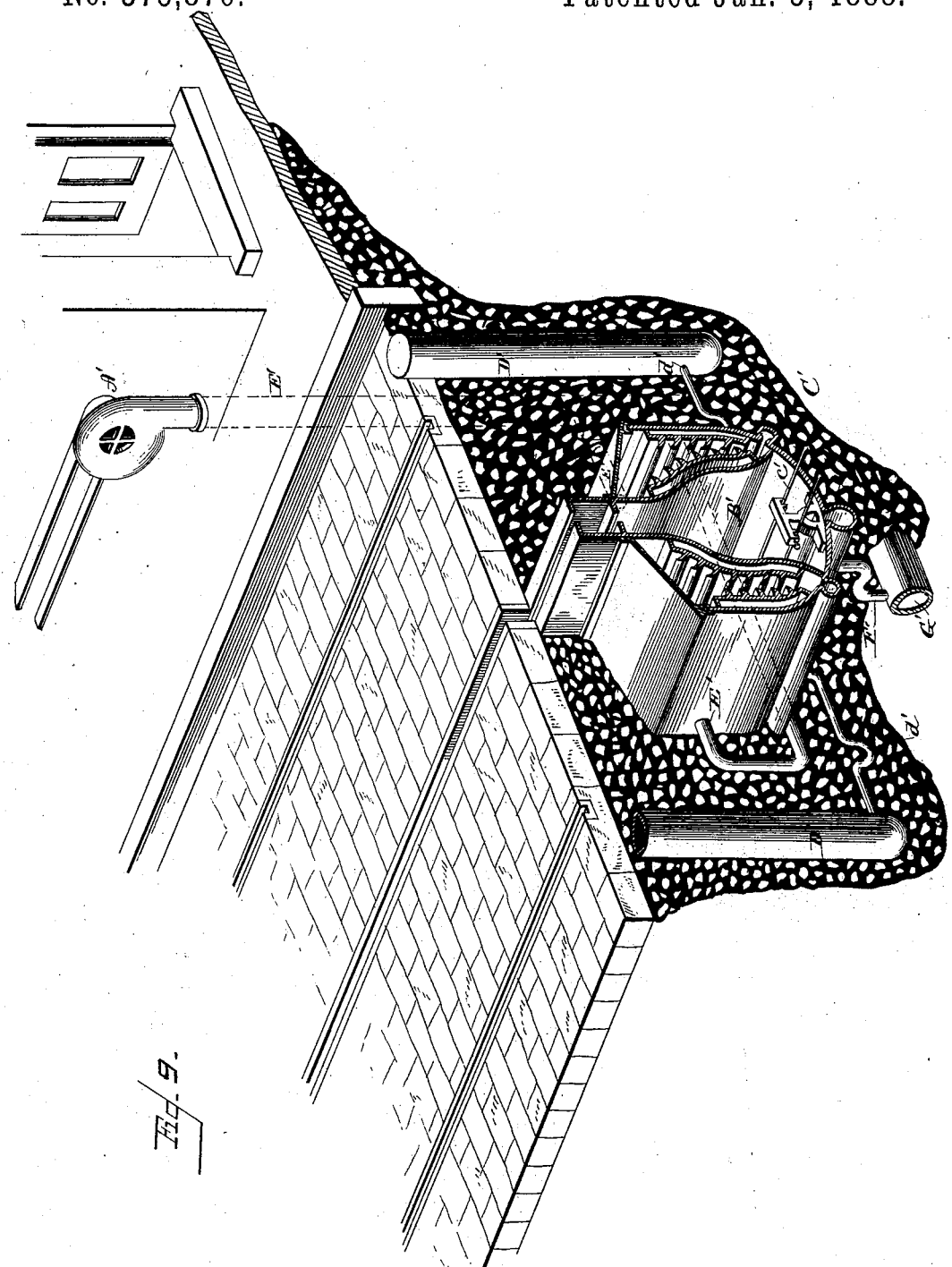

UNITED STATES PATENT OFFICE.

ISAAC LA RUE JOHNSON, OF WASHINGTON, DISTRICT OF COLUMBIA.

CONDUIT FOR ELECTRIC CONDUCTORS AND POWER-CABLES.

SPECIFICATION forming part of Letters Patent No. 375,876, dated January 3, 1888.

Application filed May 9, 1887. Serial No. 237,652. (No model.)

*To all whom it may concern:*

Be it known that I, ISAAC LA RUE JOHNSON, of the city of Washington, District of Columbia, have invented certain new and useful Improvements in Conduits or Ways for Power-Cables and Electrical Conductors, of which the following is a specification.

Figure 1:
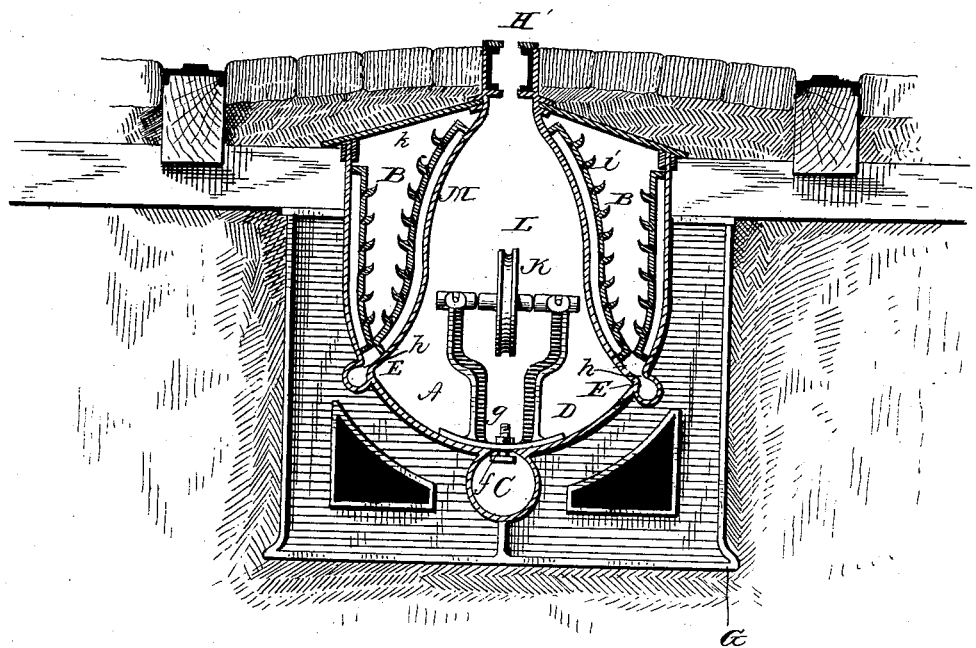
Figure 2:
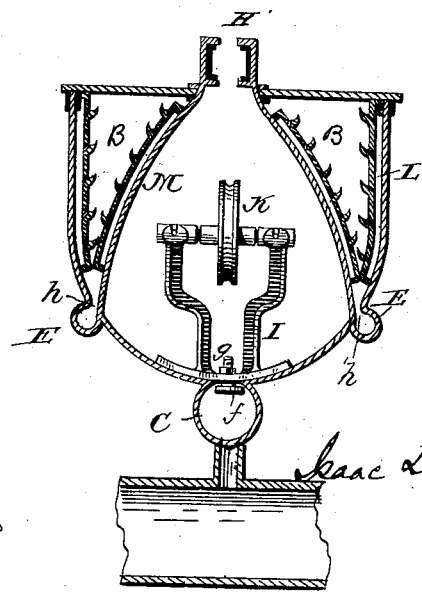
Figure 5:
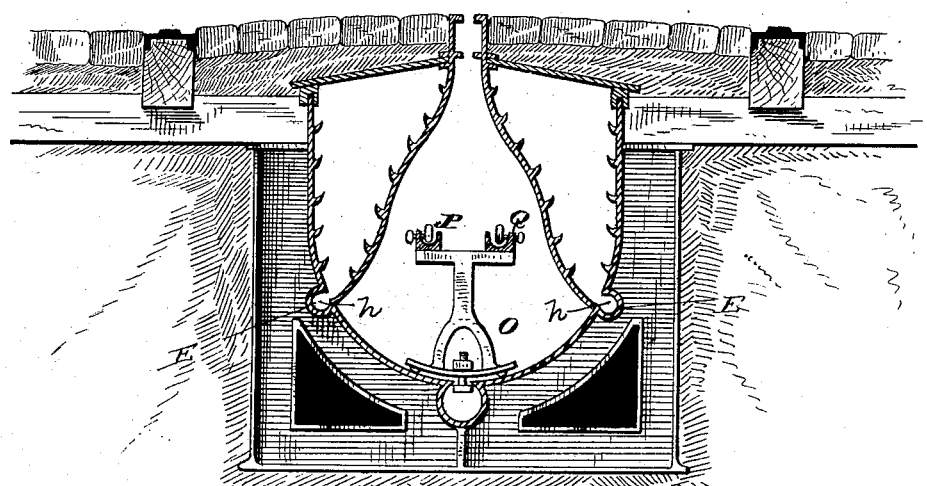
Figure 6:
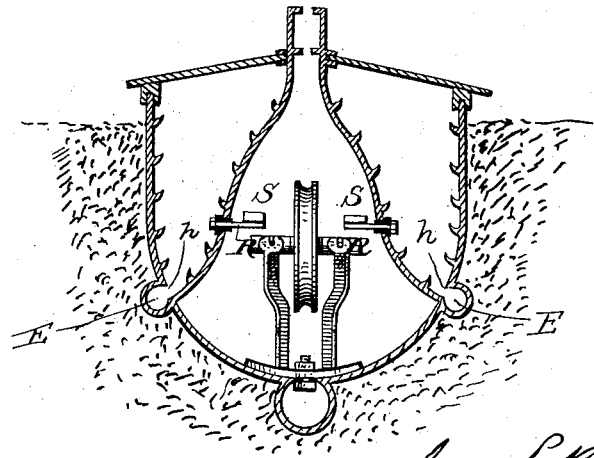
Figure 7:
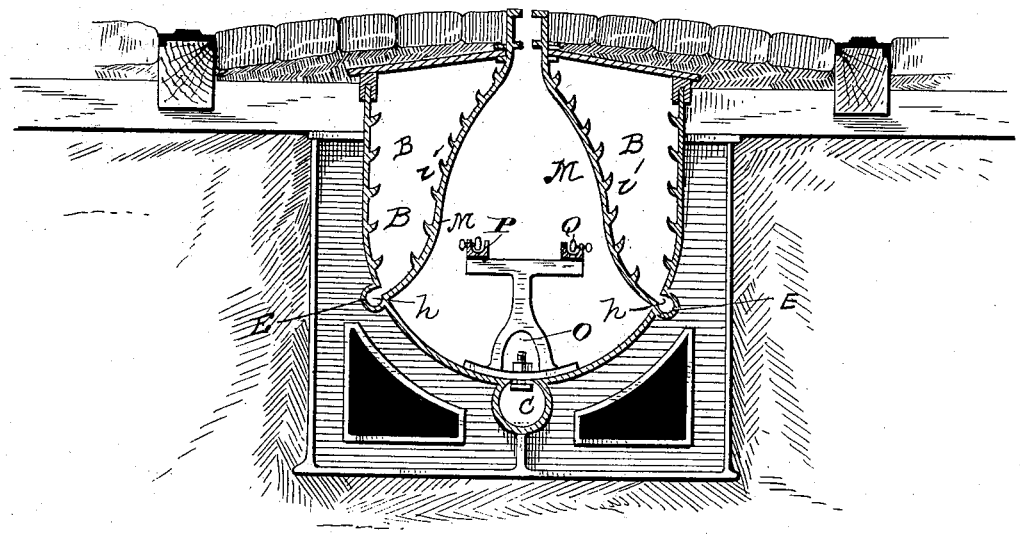
Figure 8:
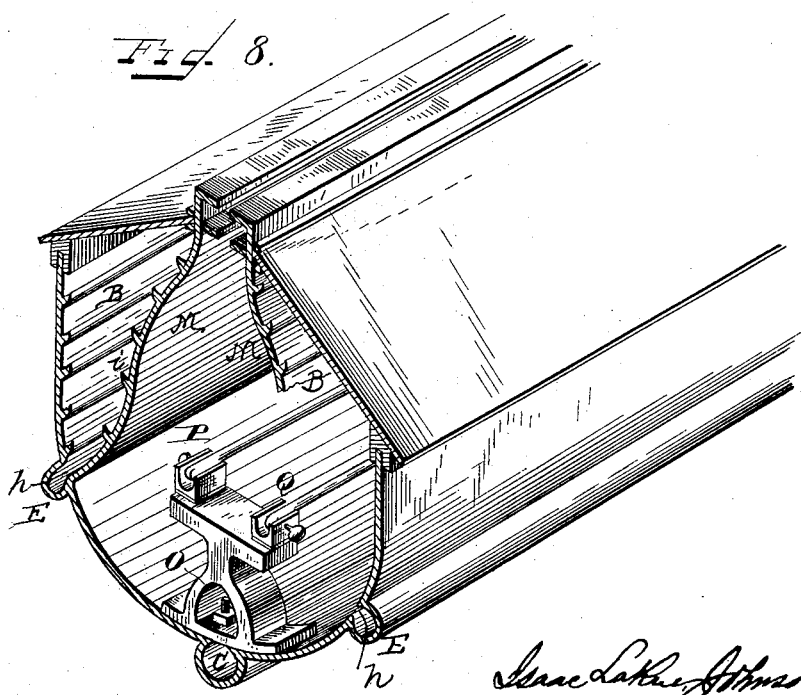

The object of this invention is to provide a conduit for electrical conductors, electrical railways, and cable-power purposes, in which the following requisites are found: Thorough ventilation and drainage of that part of the conduit in which the power-cable is located, whereby all water that finds its way into the conduit through the grip-slot, or by condensation or otherwise, is carried off by an auxiliary drain, which is below and parallel with the main conduit; chambers in said conduit, which while they are integral therewith are entirely isolated therefrom, and which afford ample space for electrical conductors of all kinds, provision being made for the isolation of high and low tension currents and the ventilation and drainage of the said chambers by means entirely independent of those connected with the main or power chamber; the ventilation of the entire structure by means of the engines that are employed to drive the power-cables, and thus at a small additional expense provide for the preservation of the entire structure and its contents; to provide, in conjunction with the foregoing, for converting the power-cable conduit or way into an electric railway, and to further provide other means and appliances that are essential to the efficiency and thoroughness of such conduit, all of which are set forth more fully in the following:

Referring to the drawings which accompany this application, Figure 1 is a sectional elevation of my improved cable conduit or way. Fig. 2 is also a sectional elevation of the same, showing modifications. Fig. 3 is a perspective view of the conduit or way, and Fig. 4 is a section of the electric-cable support, showing the brackets or corrugations in which the conductors are placed. Fig. 5 shows the standards modified to adapt them to conductors for electrical railways. Fig. 6 represents the conduit or way prepared for service either as a power-cable or electric railway. Fig. 7 shows modifications in the standards, whereby the securing-bolts are passed through an aperture therein and only the single-branched standard employed; and Fig. 8 is a perspective view showing more fully the several details. Fig. 9 is a sectional elevation, showing the drainage-connections of the several chambers of the structure, the ventilating mechanism, a concrete bed as a substitute for braces, and the reservoirs and sewer-traps.

In the drawings, A represents the conduit or way, the contour of which is preferably semi-cylindrical in cross-section, though any departure from this outline would still be within the scope of my invention.

B indicates the electric-cable chambers located one on each side of the main chamber.

C is the auxiliary drain-pipe, that is located at the bottom of the chamber, and with which it is connected, integrally or otherwise, by the longitudinal slot F, which opens freely into both.

I is the pulley-standard, which may be made in any desired form, and having the shoe D, into which it is socketed. This shoe is made to conform to the shape of that portion of the main chamber with which it is in contact, whereby when the securing-bolts $f$, which pass through said shoe and into the slot, have the nuts $g$ thereon turned down, the heads of the bolts are brought into contact with the lower side of the slot, or that part which is found in the auxiliary pipe C, and the standard is thus held rigidly in position. The bolts $f$ have their heads made oblong, so as to admit of their readily passing through the slot, and when so passed a quarter-turn will bring the longer ends of their flanges into engagement with the sides of the slot and hold the standard in position. It will be perceived that these standards may be placed at any desired interval along the line of conduit or way, and the means by which they are secured in position are so readily available that there will be no need of securing them to the structure as a fixed part thereof, as has heretofore been done of necessity.

The chambers B, which are located on both sides of the main chamber of the conduit or way, are separated therefrom by the walls M. These walls may be integral therewith, or they may be secured therein by any suitable means—as by riveting, for instance—the main object of the structure being to have such a conduit or way as will be a receptacle for electric conductors of all kinds, wherein the needs of the future, however remote, in this class of service will be amply provided for, and to furnish a power-cable and electric conduit or way that will be easily accessible not only for electric cables, but for the power-cables; that will easily be kept clean, well ventilated and drained; that will have all these essentials in one homogeneous structure, the several parts of which are as entirely isolated as if they were laid in separate trenches, and which, when once laid, will require no further outlay for either service in the way of new conduits. The walls M thereof, in conjunction with the main or outer walls of the conduit or way, form separate chambers, as indicated by the letter B, into which are set the plates or brackets $e'$, on which the electric conductors are placed. The chambers B are not to be essentially in the outline shown, as other configurations will suggest themselves which will by no means depart from the spirit or scope of my invention. At the junction of the two walls of these chambers is formed another drain-pipe, E, of less diameter than the one at the bottom of the conduit or way. Through the slot $h$, which leads into the pipe E, passes all moisture that finds its way into the chambers B, either by leakage, which must, from the very nature of the structure, be at the minimum, or from condensation. The plates or brackets are provided with the drains or perforations $i$, through which will pass any moisture that may lodge thereon, and thus keep them free from dampness.

The plates or brackets $e$ are shown as being made of some such material as asphaltum, terra-cotta, or iron; but they may be so skeletonized as to render them comparatively a network, in which case they will best subserve their purpose, as it will not be possible for them to retain any moisture whatever, and thus avoid the disintegration of the insulating material of the cable. These plates or brackets have formed on their lower meeting edges studs or bosses J, (see Fig. 4,) which prevent them meeting closely over the slots, and thereby preventing ingress of water thereto. Between the plates or brackets and the structural walls of the conduit or way are air-spaces, which are indicated by the letter L. These air-spaces afford a ready passage for driven or exhaust currents, and insure almost absolute dryness and freedom from the action of deleterious gases which permeate the earth or otherwise find their way into such structure and attack such material as the lead armor of electric cables and soon encompass its disintegration and destruction, as has been the case with creosoted, bitumenized, or kyanized woods in which such armored cables have been laid.

The chambers B are closed by covers $k$, which are suitably flanged and recessed, as shown, so as to exclude all moisture from above the same.

The drains E connect with suitable reservoirs placed along the line into which the water falls, and from which the water may be pumped, while the large drain C may be suitably trapped and connected with the sewers.

The standards I have mounted thereon in suitable bearings the power-cable pulleys K, over which the cables pass, and, as before stated, the standards may be as numerous as the exigencies of the service may require, and their adjustment in the conduit or way is a matter easily attainable at any time through the following means:

The upper sections of the conduit or way which form the grip-slot are made to be bolted in place, and as they are to be made in lengths, such lengths may be detached, and the parts of the standard and pulley having been disassembled as far as may be necessary, the parts are introduced through the opening and secured in position, after which the slot-sections are replaced. This feature has not been shown in the drawings, as, apart from any special construction, it is regarded as a mechanical expedient.

The conduit or way is braced at any necessary part throughout its length by the braces G, which are so shaped on their inner edges as to conform to that of the outline of the conduit. In lieu of the braces a bed of concrete may furnish support to the structure.

O represents the standards, having a bifurcation at the end which engages the shoe, through which the securing-bolt is passed. This renders the use of but one bolt necessary, though more may be employed.

P and Q are the insulators and conductors for the electric railway, though I do not confine myself to the exact construction or adjustment shown, as various modifications will suggest themselves.

The conversion of the conduit or way into an electric railway is accomplished by changing the character of the bracket or arms on the standard so as to adapt it to the support of the conductors either above or below the plane of said brackets or arms. In the latter instance the conductors are placed beneath suitably-insulated strips, and are thus protected from dirt and moisture, all of which is shown in Figs. 5 to 8 of the drawings, and in all of which the shoe of the standard, as well as such other parts thereof as may be desired, are properly insulated.

In Fig. 6 of the drawings are shown the means for using the conduit both as an electric railway and as a power-cable-way simultaneously or alternately, as may be desired. The adjustable standard and its appurtenances I regard as a very important departure from that which has already been done in the art, as it enables additional standards to be inserted whenever desired, and thus overcome any sagging of the cables, whether running in a vertical or horizontal plane, as may be easily done in my construction.

In Fig. 9 of the drawings, A' represents any suitable ventilating mechanism; B', a section of the conduit or way; C', the concrete bed; D', the reservoirs in which drainage from the electrical-conductor chambers is collected through the trapped pipes d'. E' represents, partly in dotted lines, the several ventilating-pipes leading into the conductor-chambers, and F' the trap connecting the main drain-pipe of the conduit with a sewer, G'. All drainage-connections must be suitably trapped to prevent the entrance of vermin or gas.

The chambers B, which contain the electrical conductors for the several kinds of service, being air and water tight, are admirably adapted for the passage of currents of hot air therethrough, and by this means the entire structure may be warmed to such a degree as to prevent the formation of ice therein, and snow that may drift through the grip-slot will be speedily melted and carried off by the drain-pipe C. Should there be no conductors of any kind in these chambers B, steam may be forced in for heating and drying the power-cable chamber, and moisture that gathers in the chambers B from condensation may be carried off to a suitable reservoir through the drains E E.

In operation the electric or power cables are placed in the inner chamber in the usual way and as many standards secured therein as may be required, though others may be easily inserted, as before indicated, should the sagging of the cables require it. The electric cables or conductors are drawn in through man-holes in the covers k, which are easily reached by removing a part of the pavement, and mechanism, which forms no part of this application, in addition to the ordinary means, is provided for inserting such cables. The engines which drive the power-cables have exhaust or driving fans connected with them, and by means of these, currents of hot or cold air are kept passing through all the chambers of the way. The air which is forced or drawn through the chambers B can have but the designated outlets, and these chambers may therefore be regarded as air and water tight and their ventilation and drainage thorough and efficient, while in consequence of the grip-slot there might not be that thoroughness in ventilation of the power-cable chamber that could be secured for those containing the electric cables; yet, in addition to the complete drainage thereof, should air, heated or cold, be drawn or forced through the drain-pipe C, it will find its way into the main chamber and, to a great extent, along the entire line. This is a great desideratum, as the air therein in summer may be kept at the same temperature as the external air, while in winter, snow that passes through the grip-slot may be melted and the formation of ice also prevented. This is of great importance in sections of the country that are subject to heavy snow-falls and extreme cold, and should heated air be forced or drawn through them it will warm the walls of the entire structure and thereby prevent the formation of ice or the accumulation of snow.

Conductors for currents of high tension may be placed in one chamber and those for low tension in the opposite one, and difficulties experienced from the inductive influence of the former upon the latter will thereby be avoided.

Having thus described my invention, what I claim as new, and desire to secure by Letters Patent, is—

1. A conduit or way for power-cables for street-railways having lateral auxiliary conductor-chambers, through which currents of hot or cold air are passed, by means of suitable fan mechanism, to dry simultaneously all the chambers and to ventilate the conductor-chambers, substantially as described.

2. A combined conduit or way for power-cables for street-railways and electrical conductors having lateral auxiliary chambers for electrical service, through which hot or cold air currents are passed, by means of suitable fan mechanism, to ventilate and dry the same, and dry or thaw out the power-cable chamber, substantially as described.

3. A combined conduit or way for power-cables for street-railways having lateral auxiliary air and water tight chambers for electrical service, through which currents of hot or cold air are driven or exhausted, by means of suitable fan mechanism, for ventilating and drying the same, and thereby drying or thawing out the cable-way proper, substantially as described.

4. A conduit or way for power-cables and electrical railways having a chamber for the cable-way proper, with a slotted drain-pipe at its bottom, and having auxiliary chambers at its sides, with drain-pipes at the bottom of said chambers for carrying away all moisture that may be precipitated therein, substantially as described.

5. A conduit or way for power-cables and electrical conductors having a longitudinally-slotted drain-pipe at its bottom, and lateral or side chambers having similarly-slotted drain-pipes at the meeting portions of their converging sides, the conduit or way proper being provided with adjustable standards and their cable-bearing pulleys, substantially as described.

6. A conduit or way for power-cables and electrical conductors of semi-cylindrical form and having lateral chambers, and all provided with longitudinally-slotted drain-pipes at their converging sides, through the lower one of which pass the binding-screws of standards having pulleys attached thereto, over which pass power-cables for street-railway service, substantially as described.

7. A conduit or way for power-cables and conductors for electricity having an approximately semi-cylindrical contour and a slotted drain-pipe at the bottom thereof, and having also a lateral chamber throughout its length and lying within the walls of the same, and provided, also, with slotted drain-pipes, and a pulley-standard detachably secured therein at desired intervals for supporting power-cables, substantially as described.

8. A conduit or way for power-cables and electrical conductors having the main or power-cable chamber A of approximately semi-cylindrical form, the lower longitudinally-slotted drain-pipe, C, the air and water tight lateral chambers B for electrical conductors, and the curved bracket-supports therein for electrical conductors, substantially as described.

In testimony whereof I affix my signature in presence of two witnesses.

ISAAC LA RUE JOHNSON.

Witnesses:
W. P. BELL,
RICHARD P. ANDERSON.